(12) United States Patent
Rodemer et al.

(10) Patent No.: US 7,007,773 B2
(45) Date of Patent: **\*Mar. 7, 2006**

(54) LUBRICATION DEVICE

(75) Inventors: Karl Rodemer, Heidelberg (DE); Heinz Rühl, Bruchsal (DE)

(73) Assignee: Lincoln GmbH & Co., KG, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/808,415

(22) Filed: Mar. 25, 2004

(65) Prior Publication Data

US 2004/0178019 A1   Sep. 16, 2004

Related U.S. Application Data

(62) Division of application No. 09/950,080, filed on Sep. 12, 2001, now Pat. No. 6,742,625.

(30) Foreign Application Priority Data

Sep. 12, 2000 (DE) .......................... 200 15 780 U

(51) Int. Cl.
*F16N 13/22* (2006.01)
(52) U.S. Cl. .................... 184/15.2; 184/15.3; 198/493; 198/811
(58) Field of Classification Search .............. 184/15.1, 184/15.2, 15.3; 198/500, 495, 493, 811
See application file for complete search history.

(56) References Cited

U.S. PATENT DOCUMENTS

| | | | |
|---|---|---|---|
| 3,503,470 A | 3/1970 | Lister | 184/55.1 |
| 3,599,753 A | 8/1971 | Walsh | 184/15.2 |
| 4,064,970 A | 12/1977 | Reeves | 184/15.3 |
| 4,095,674 A | 6/1978 | Kido et al. | 184/6.1 |
| 4,150,611 A | 4/1979 | Bellini | 99/548 |
| 4,262,776 A | 4/1981 | Wilson et al. | 184/15.1 |
| 4,537,285 A | 8/1985 | Brown et al. | 184/15.2 |
| 4,674,622 A | 6/1987 | Utsunomiya et al. | 198/500 |
| 4,760,925 A | 8/1988 | Stehle et al. | 209/616 |
| 4,934,510 A | 6/1990 | Lutgendorf | 198/461.3 |
| 5,129,481 A | 7/1992 | King | 184/15.3 |
| 5,147,028 A | 9/1992 | Raggi | 198/495 |

(Continued)

FOREIGN PATENT DOCUMENTS

DE   710 004   9/1941

(Continued)

*Primary Examiner*—David Fenstermacher
(74) *Attorney, Agent, or Firm*—Wenderoth, Lind & Ponack, L.L.P.

(57) ABSTRACT

A lubrication device lubricates traveling lubrication sites, such as on a belt (1), in particular, on a roller or chain belt (1). The lubrication device includes a lubricating apparatus (2) having a catch (C) that is capable of assuming a resting position and a catching position relative to the belt (1). In the catching position, a lubricating head (D) of the lubricating apparatus (2) is moved to a lubrication site by relative lateral motion between the belt (1) and the lubricating apparatus (2) in order to supply lubricant to the lubricating site. At the end of the run path, the lubricating head (D) as well as the catch (C) moves relative to the belt (1) to return back to the resting position. Also, before or simultaneously while the catch (C) is brought into engagement with the belt (1), the lubricating apparatus (2) can be extended in a longitudinal direction of the lubrication site motion at a boosting speed, which is greater than zero and less than the speed of the belt (1).

23 Claims, 8 Drawing Sheets

U.S. PATENT DOCUMENTS

| | | | |
|---|---|---|---|
| 5,289,899 A | 3/1994 | King | 184/12 |
| 5,337,884 A | 8/1994 | Hoffman et al. | 198/500 |
| 5,695,043 A | 12/1997 | Maezuru et al. | 198/689.1 |
| 5,873,946 A | 2/1999 | Hantmann | 134/15 |
| 6,302,263 B1 | 10/2001 | Bennett et al. | 198/495 |
| 6,419,078 B1 | 7/2002 | Leathers | 198/500 |
| 6,742,625 B1 * | 6/2004 | Rodemer et al. | 184/15.2 |

FOREIGN PATENT DOCUMENTS

| | | |
|---|---|---|
| DE | 199 02 342 A1 | 7/2000 |
| FR | 2 700 200 A1 | 7/1994 |
| WO | 94/09308 | 4/1994 |

* cited by examiner

LUBRICATION DEVICE

This application is a divisional application of Ser. No. 09/950,080 filed Sep. 12, 2001, now U.S. Pat. No. 6,742,625 now allowed.

BACKGROUND OF THE INVENTION

The invention relates to a lubrication device for lubricating traveling lubrication sites, such as those on a belt (such as a roller or chain belt), which comprises a lubricating apparatus supported so as to be displaceable back and forth in the longitudinal direction of the lubrication site motion. The lubricating apparatus includes a catch assuming a resting position and a catching position relative to the belt a similar component having the lubrication sites. The belt drives the catch in the catching position and thus drives the catch along the lubricating apparatus over a predetermined run path at the speed of the belt. A lubricating head can be moved through a lateral relative motion between the belt and the lubricating apparatus to a lubrication site, and lubricant can be supplied to At the end of the run path, the lubricating head and the catch relative to the belt return into the particular resting position, and the lubricating apparatus can be moved back along the belt into its starting position.

With such known lubrication devices, difficulties occur with lubrication site speeds above a predetermined limit value, for example of 0.4 m/sec, because the large acceleration forces occurring therein lead to the failure of the catch.

SUMMARY OF THE INVENTION

It is an object of the present invention to propose a lubrication device of the above-described type, which can be employed even with relatively high lubrication site speeds.

This object is achieved according to the invention with a lubrication device of the above described type, in which, before or simultaneously with the engagement of the catch and the belt, the lubricating apparatus can be extended in the longitudinal direction of the lubrication site motion at a boosting speed which is greater than zero and less than the speed of the belt.

In this way, it is possible to ensure that the speed difference between the lubrication sites and the lubricating apparatus before the lubricating process is not greater than the maximum speed below which a failure of the catch must be prevented.

It has been found in practice that the boosting speed of the lubricating apparatus should be no less than a predetermined maximum difference, such as for example 0.4 m/sec, less than the speed of the belt. The difference between the speed of the belt and the boosting speed is thus no greater than the permissible value of 0.4 m/sec.

Under these conditions, the boosting speed of the lubricating apparatus is preferably no more than a predetermined maximum value, for example 0.4 m/sec. If the belt runs slower than the lubricating apparatus accelerated to the boosting speed, an end position of an acceleration device (for example an acceleration cylinder) will stop and wait until it is driven by the belt in the conventional manner. Since the lubrication site speed in this case is less than approximately 0.4 m/sec, problems cannot be encountered with the catch.

In a special implementation of the invention, the boosting motion of the lubricating apparatus is provided by an acceleration device, such as an acceleration cylinder or a setting motor, if appropriate, against the effect of a return cylinder in order to avoid the rebounding of the catch from the belt.

In a further implementation of the invention, the boosting speed of the lubricating apparatus can be set, if appropriate, by a one-way restrictor valve, in order to be able to readily adapt the lubrication device to the particular conditions.

The acceleration cylinder preferably becomes pressure-free as soon as the lubricating head starts the delivery of the lubricant. After reaching the predetermined boosting speed of, for example, 0.4 m/sec, the lubricating apparatus is driven in a conventional manner by the belt under the action of the catch, and is accelerated to, for example, 0.8 m/sec.

A further characteristic of the invention is that during the return motion of the lubricating apparatus along the belt to the starting position, the acceleration cylinder can simultaneously be movable free of pressure into the starting position. The lubrication device in this case is ready for a new lubricating operation.

The speed of the return motion of the lubricating apparatus can therein be settable, if appropriate, by a one-way restrictor valve on the return cylinder.

It has been found in practice that the counter pressure of the return cylinder during the forward motion of the lubricating apparatus is approximately 0.5 bar and the return pressure of the return cylinder during the back motion of the lubricating apparatus along the belt is approximately 6 bar.

A further independent concept of the invention is that a lubrication device of a lubricating apparatus including a lubricating head, together with the catch and preferably with its aid, is movable laterally (perpendicularly) with respect to the belt. But it is also possible that the belt is movable, preferably with the aid of the catch, which is movable jointly with the lubricating apparatus along the belt, transversely to the longitudinal direction of the lubrication site motion in the direction toward the lubricating head. With the aid of the catch, the lubrication site to be lubricated is thus brought close to the lubricating head while it is laterally immovable or, conversely, the lubricating head is brought to the lubrication site.

The catch can comprise, for example, a catch arm which engages from above or below the elements of a roller or chain belt. This can take place bypivoting.

The catch arm therein preferably has at its outer end a fork-shaped member for the purpose of engaging over a roller or chain link axle.

In the event of malfunction, it is useful if the catch arm can be swung in the direction of motion of the roller or chain link axle, over which by way of example it engages, out of its path of motion. In this way, while the roller or chain belt is continuing to run, the catch can be stopped from functioning.

Known lubrication devices of this type are adapted specifically to the particular application case. Fast and flexible adaptation of the lubrication arrangement to modified rollers or chain belts with lubrication sites at varying spacings is not possible. In addition, only one lubrication site can always be supplied with lubricant in one lubricating cycle, which is a particular disadvantage in chain belts with double bearing roller pairs.

It is therefore a further object to provide a lubrication device of the above described type which can be adapted in a simple manner to different lubrication site distributions of lubrication site numbers.

This object is solved according to the invention in a lubrication device of the above described type in which two sensors are provided spaced apart from one another in the direction of motion of the belt. The sensor signals are used for detecting two lubrication sites spaced apart from one another in the longitudinal direction of the belt. For the supply of both lubrication sites, at least two lubricating heads are provided.

The invention entails an advantage that, for example, rollers or chain belts with uniformly distributed lubrication sites, as well as rollers or chain belts with varying lubrication site numbers and/or spacing and with individual support roll pairs, as well as also with double support roller pairs, can automatically be lubricated.

It is an of advantage if the spacing of the two sensors agrees substantially with the spacing of successive lubrication sites of the belt since, in this case, the signals of both sensors occur substantially concurrently.

A further characteristic of the invention is that the spacing of the sensors can be set in order to be adapted to different belts to be lubricated. This feature also applies to the lubricating head spacing.

A further invention embodiment includes, in a lubrication device of the above described type, at least two lubricating heads which, with respect to the belt oppose one another. From their respective sides, the lubricating heads can be moved in a direction toward the lubrication sites of the belt synchronously and, if appropriate, also away from the sites so that the charging forces, resulting from the lubrication pressure onto the lubricating apparatus and the belt, can be equalized.

Lubrication which is especially optimized with respect to time is brought about if the lubricating apparatus has two pairs of lubricating heads, which can be moved under control pairwise in a direction toward the lubrication sites of the belt and away from it. Such a lubrication device is particularly suitable for the lubrication of with double support roller pairs.

If the lubricating heads are disposed jointly on a carriage, this permits the common acceleration of the lubricating heads before the lubricating heads have been set onto the lubrication site. This carriage should, in this case, also support the catch.

A further characteristic of the invention is that the lubricating heads are disposed substantially mirror-symmetrically with respect to the belt disposed between them.

In particular, for the lubrication of belts, which apart from the bearing rollers also comprise guidance rollers whose axes of rotation are disposed at an angle (preferably perpendicular), to the axes of rotation of the bearing rollers, it is advantageous if the lubrication sites of the guidance rollers are lubricated with a lubrication device according to DE 200 15 780 U.

BRIEF DESCRIPTION OF THE DRAWINGS

Further goals, characteristics, advantages and application feasibilities of the invention will be evident from the following description of embodiment examples in conjunction with the drawings, in which.

DETAILED DESCRIPTION OF THE INVENTION

Figure 1:
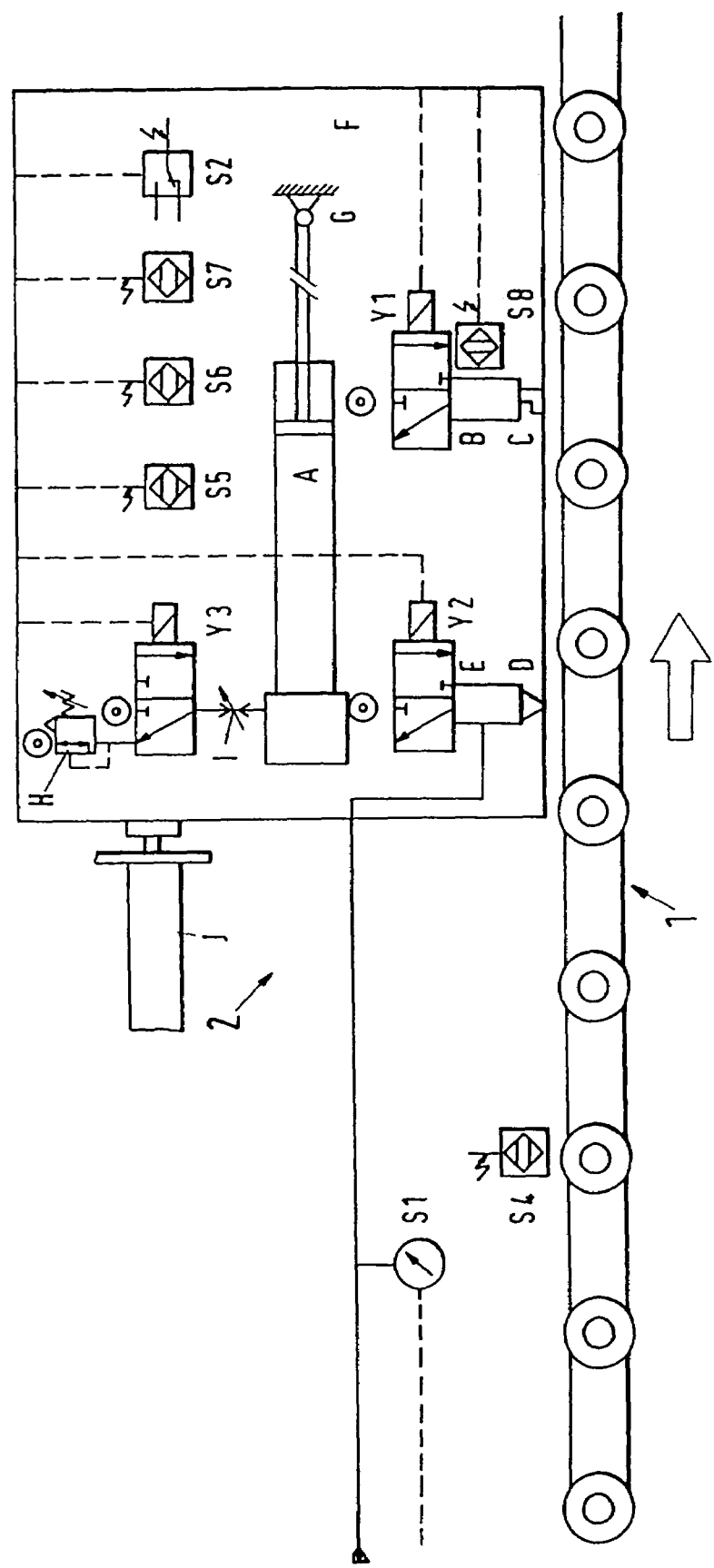
FIG. 1 is a schematic view of a lubrication device of a first embodiment.

The graphically represented lubrication device serves for lubricating traveling lubrication sites, for example on a roller and chain belt 1. To supply the lubrication device, lubricant is supplied from a central lubrication pump. The driving of the pump takes place via a pressure switch S1 with two switching points: p≦pmin (pump on) and p≧pmax (pump off). At the beginning of the lubrication process, a proximity switch S5 is switched in order to indicate the operational readiness of the lubrication device.

A proximity switch S4 inductively acquires the position of a traveling lubrication site, for example a tread roller, which is to be lubricated, and switches therein a 3/2-way valve Y1. Air pressure is thereby placed into a catch cylinder B and a catch C is pushed outward. The sequence of the lubricating processes (i.e., whether or not, for example, every tread roller or every second tread roller is to be lubricated) depends on the number of tread rollers and on the speed of the chain or roller belt or the roller spacing.

The catch C subsequently intercepts the tread roller to be lubricated and therein moves the lubricating apparatus 2 parallel to the tread roller in order to carry out the lubrication process. For this purpose, the lubricating apparatus 2 is disposed on a carriage F, which is supported on a frame G so as to be readily displaceable. In order for the carriage F to move jointly with the tread roller under control and not by jerks, a return cylinder A is acted upon with a preset damping pressure via a pressure regulator H.

During the motion process a (not shown) switching element intercepts a proximity switch S6 and switches a 3/2-way valve Y2. Air pressure thereby acts upon a lubricating head cylinder E, such that a lubricating head D is moved out toward the lubrication site as, for example, a lubricating nipple. By pressing the lubricating head D onto the roller nipple, a piston delivers the lubricant from a prefilled dosing chamber to the lubrication site.

When the switching element leaves the proximity switch S6, the 3/2-way valve Y2 is moved again into the resting position. A reset spring of the lubricating head cylinder E moves the lubricating head D back into its starting position. A central supply pump fills the dosing chamber with lubricant for the next delivery stroke.

When the switching element reaches a proximity switch S7, it switches the 3/2-way valve Y1 again back into its starting position. A reset spring of the catch cylinder B moves the catch C back into a starting position. With the aid of a fast venting valve, fast resetting can be accomplished.

When the catch C has reached its starting position, a proximity switch S8 switches the valve Y3. In this way, compressed air acts on the double-action return cylinder A and the damping pressure, which was generated in the forward motion of the lubricating apparatus 2, is switched off. The lubricating apparatus 2 moves back into its starting position. The return speed can be regulated via a choke valve.

A possibly provided position switch (roller-lever switch) S2 has safety functions. In the event of failure or sluggish operation of the proximity switch S7, the switching element actuates the position switch S2. In this case, all valves are switched to be voltage-free and the lubricating apparatus 2 remains in its end position. In order to avoid damage through automatic return transport, the lubricating apparatus 2 must be manually brought out of the end position. After the malfunction has been resolved, the lubricating apparatus 2 subsequently automatically moves back into the starting position.

According to the invention, the carriage F, which carries the lubricating apparatus 2, is engaged by an acceleration cylinder (boost cylinder) J. The acceleration cylinder is controlled by a valve such that before or simultaneously with the extension of the catch C, a boosting phase of the carriage F, and thus the lubricating apparatus 2, takes place. The sensor control is thus such that the belt 1 at speeds greater than a predetermined maximum speed, for example greater than 0.4 m/sec, meets the catch C within a predetermined boosting path. The carriage F is then moved with a boosting speed, settable through the one-way restrictor valve, of, for example, 0.4 m/sec parallel to belt 1. From the outset, the return cylinder A acts with approximately 0.5 bar against the carriage motion, in order to prevent the rebounding of catch C from belt 1. Approximately 10 mm after the end of the boosting path the proximity switch S6 actuates the lubricating head D, whereby the lubricating process is initiated. Simultaneously, the acceleration cylinder J becomes pressure-free. After the delivery phase of the lubricant to belt 1, the proximity switch S6 allows the lubricating head D to move back. Simultaneously, the prepressure or the contact pressure of 0.5 bar applied by an additional valve against the carriage motion is discharged. After a short time delay, the catch C also moves back, which in its end position actuates the proximity switch S8 and thus initiates the return of carriage F. During the return of carriage F, the pressure-free acceleration cylinder J is also moved into the end position. The return speed of carriage F can be set with a one-way restrictor valve I on return cylinder.

When carriage F is again in the starting position, sensor S5 is actuated, which reduces the full return pressure of approximately 6 bars by change-over switching via a pressure reducer by an additional valve to the contact pressure of 0.5 bar. Thus, the lubrication device is again in the starting position.

Figure 2A:
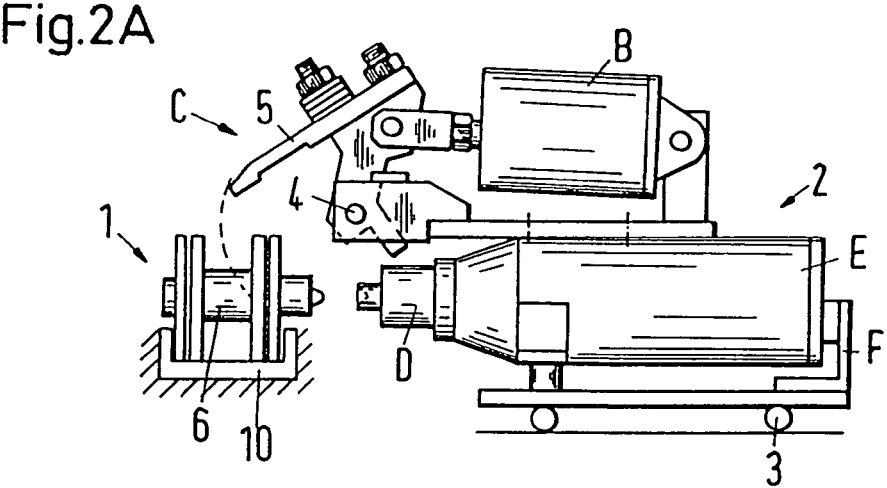
FIG. 2a is a side view of a lubricating apparatus according to the first embodiment, and including a catch disposed thereon in a position extended toward a lubrication site before the engagement of the catch into a belt.
Figure 2B:
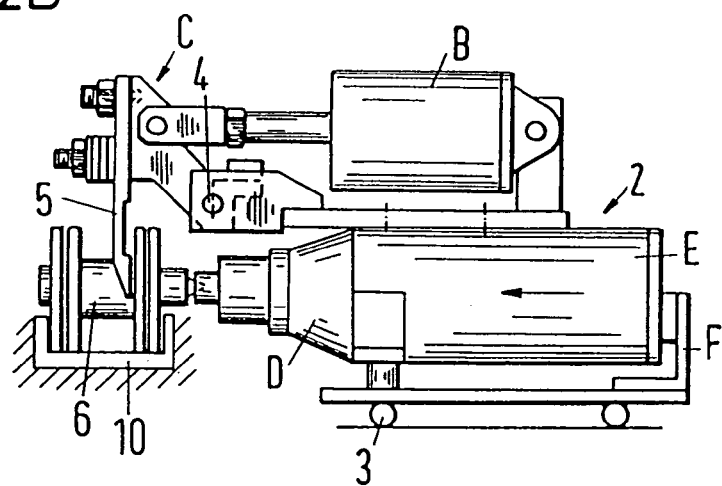
FIG. 2b is a side view corresponding to FIG. 2a, in which the catch is pivoted into thebelt.
Figure 2C:
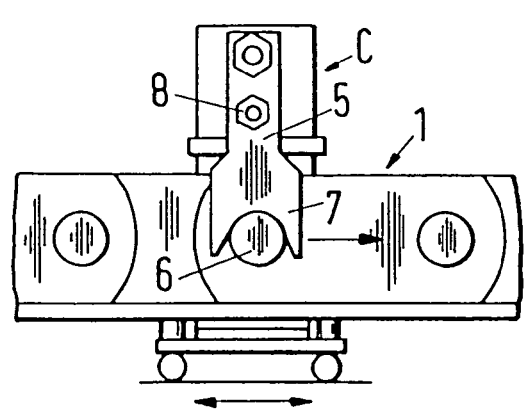
FIG. 2c is a front view of a belt to be lubricated, in which the catch has assumed the position of FIG. 2b.
Figure 2D:
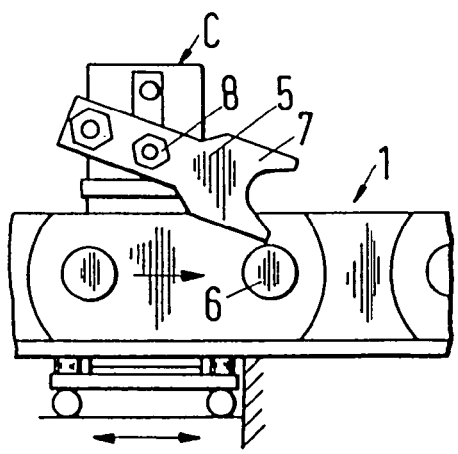
FIG. 2d is a front view corresponding to FIG. 2c, in which the catch arm of the catch is pivoted out of the path of motion of the chain link axle in the direction of motion of the belt.
Figure 3A:
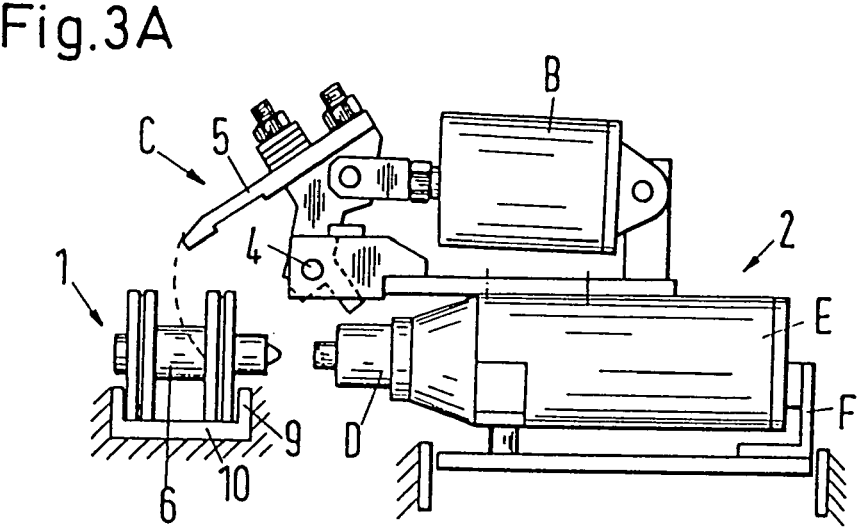
FIG. 3a is a side view of a second embodiment of the lubricating apparatus which is laterally immovable, in which the belt is laterally displaceable.
Figure 3B:
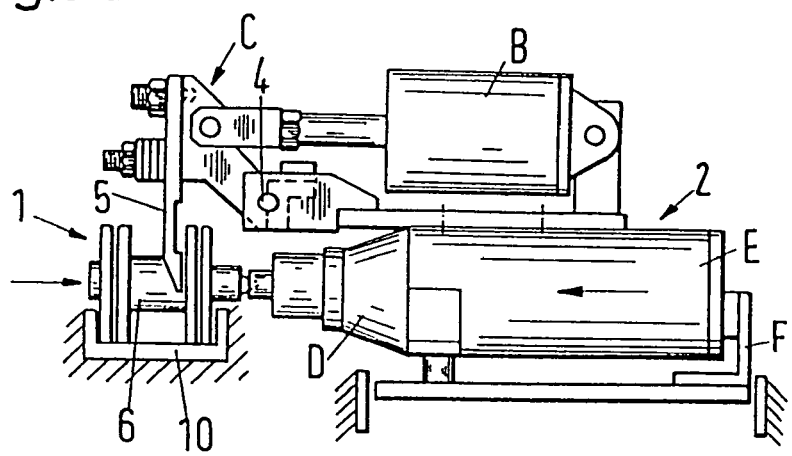
FIG. 3b is a side view of a lubricating apparatus with the catch corresponding to FIG. 3a, in which a catch arm is pivoted over a chain link axle, and the corresponding chain link comprising the lubrication site to be lubricated has been laterally displaced in a direction toward the lubricating head of the lubricating apparatus.
Figures 3C, 3D:
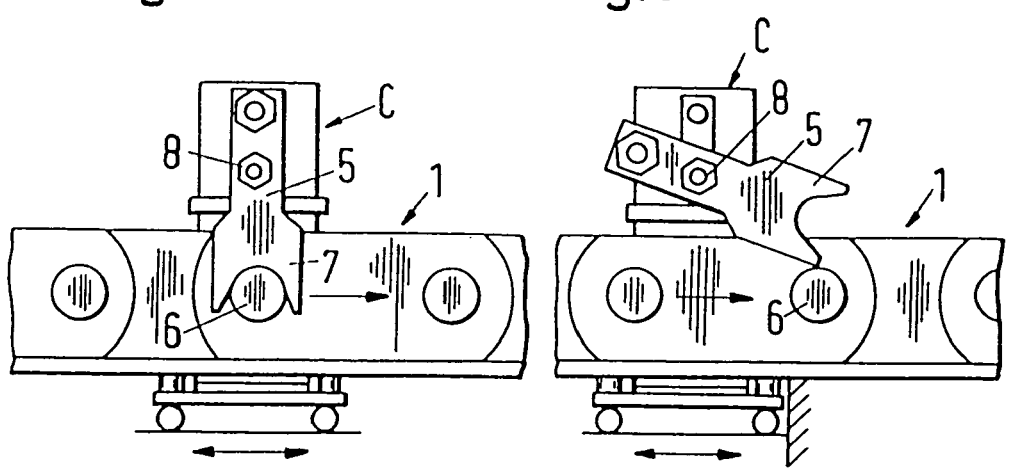
FIG. 3c is a front view of the lubricating apparatus shown in FIG. 3a, in an arrangement similar to that shown in FIG. 2c.
FIG. 3d is a front view of the lubricating apparatus shown in FIG. 3a, in an arrangement similar to that shown in FIG. 2d.

According to FIGS. 2a to 2d the lubricating apparatus 2 is laterally displaceable with the aid of a carriage F comprising rollers 3 perpendicular to the direction of motion of the chain belt 1 guided bilaterally in a track 10, such that the lubricating head D can be brought into and out of engagement with the lubrication site to be lubricated. The lubricating apparatus 2 supports a catch C whose catch cylinder B pivots a catch arm 5 supported about a swivel axle 4. In the resting position depicted in FIG. 2a, the catch arm 5 is above the chain belt 1. When the piston of the catch cylinder B is extended out as shown in FIG. 2b, the catch arm 5 is pivoted onto a chain link. The catch arm 5 with a fork-shaped end 7 shown in FIG. 2c engages over a chain link axle 6. As shown in FIG. 2d, the catch arm 5 is supported so as to be pivotable about a further swivel axle 8 which is perpendicular to the direction of motion of belt 1 such that the catch arm 5 can be pivoted in the direction of motion of the chain link axle 6 out of its direction of motion under excessive stress or against the action of a reset force into an arrested resting position. This is an advantage if a malfunction occurs in the motion of the lubricating apparatus 2 along the chain belt 2 and the chain belt 1 to be lubricated continues moving.

The embodiment of a lubricating apparatus 2 with a catch C, as depicted in FIGS. 3a to 3d, differs from the embodiment depicted in FIGS. 2a to 2d in that the lubricating apparatus 2 supporting the catch C is laterally immovable. However, the chain belt 1 can be moved with the aid of the catch arm 5 from a starting position depicted in FIG. 3a (in which it is spaced apart from the lubricating head D) by the pivoting of the catch arm 5 into an end position depicted in FIG. 3b in which the lubrication site to be lubricated is guided to the outlet opening of the lubricating head D. An edge of the track on which belt 1 runs provides the correct lateral positioning of the chain belt 1 in the proximity of the lubrication site.

Figure 4:
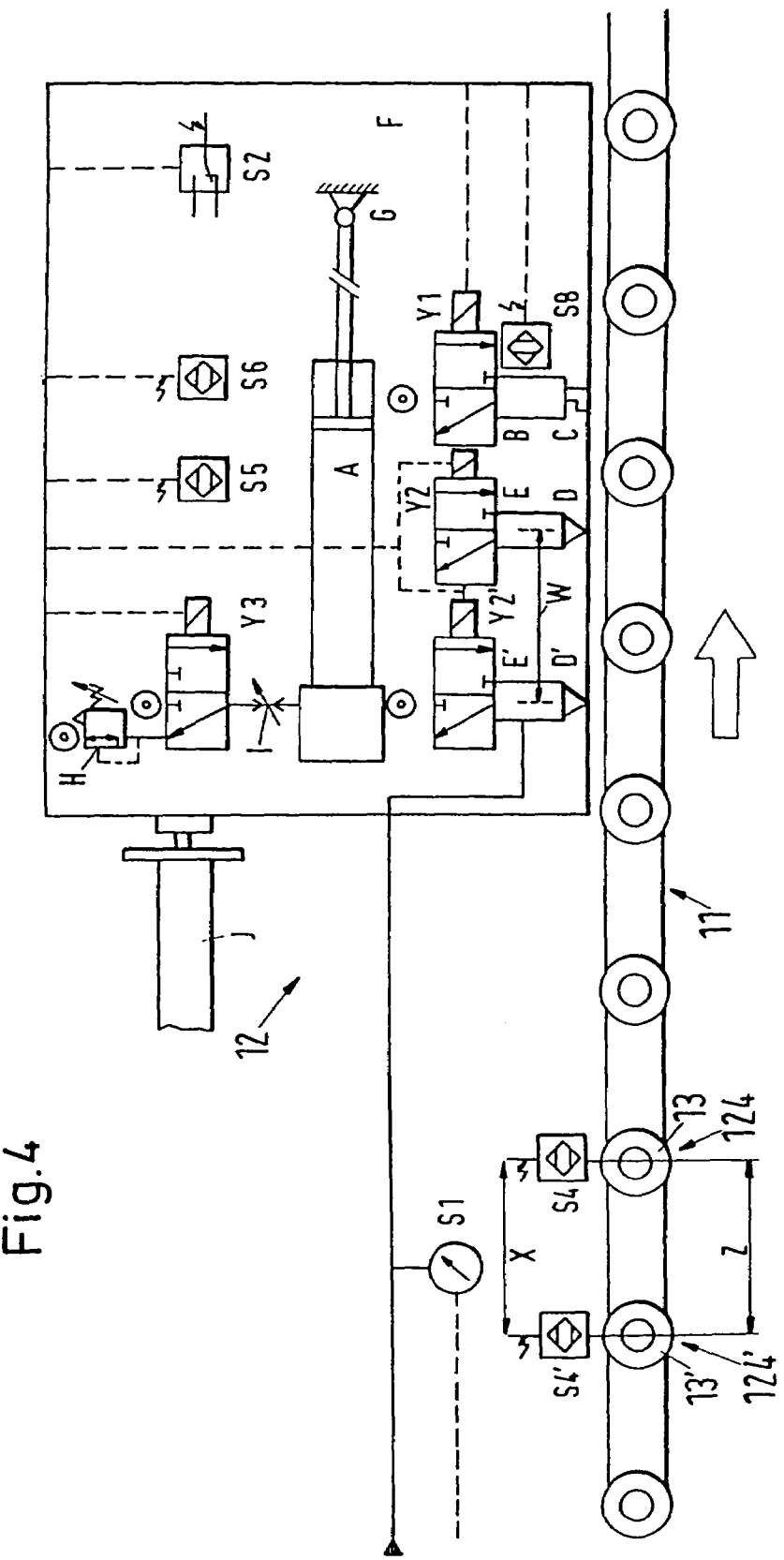
FIG. 4 is a schematic view of a lubrication device of a third embodiment of the present invention.

The lubrication device depicted graphically in FIG. 4 lubricates traveling lubrication sites, for example on a roller and chain belt 11 having bearing rollers 13 to be lubricated and individual roller pairs 124, 124' (FIG. 4) and double roller pairs 125 (FIGS. 8 and 9) comprising roller or chain link bolts 14. The roller or chain belt 11 can be guided on a track 17 provided with edges 16. To supply the lubrication device, lubricant is supplied from a central lubrication pump. The driving of the pump takes place via a pressure switch S1 with two switching points: $P \leq P_{min}$ (pump on) and $P \geq P_{Max}$ (pump off). At the beginning of the lubrication process a proximity switch S5 is switched in order to indicate the operational readiness of the lubrication device.

A proximity switch S4 inductively acquires the position of a traveling first lubrication site, for example a bearing roller 13, which is to be lubricated. A second proximity switch S4' is provided for the acquisition of the position of a second adjacent traveling bearing roller 13' of a further individual roller pair 124' or of a doubleroller pair 125, which is to be lubricated in the same operating cycle. The distance between the two lubrication sites (i.e., the spacing Z between the roller axes of two individual roller pairs 124, 124' (FIG. 1) or of double bearing roller pairs 125 (FIG. 8)) can basically be developed in any desired way. However, it is important that the spacing X of the two switches S4, S4' agrees at least substantially with the spacing Z of the roller axes of the bearing rollers 13, 13' (FIG. 4) between two individual roller pairs 124, 124' (FIG. 4) or of double bearing roller pairs. For example, proximity switch S4 initially switches a 5/2-way valve Y1. Air pressure is thereby output into a catch cylinder B and a catch C extends outward. Details of catch C can be found in the Utility Patent DE 200 15 780 U, whose disclosed content is fully incorporated into the present disclosure. The sequence of the lubrication process (i.e., whether for example each pair of bearing rollers 13, 13' or every second pair of bearing rollers 13, 13' is to be lubricated) depends fundamentally on the number of bearing rollers and the speed of the chain or roller belt or the roller spacing.

The extended catch C intercepts the chain 11 so that the chain 11 moves the lubricating apparatus 12 parallel to the bearing roller 13, in order to carry out the lubrication process. The lubricating apparatus for this purpose is disposed on a carriage F, which is supported readily displaceably on a frame or a base plate G. In order for the carriage F to move jointly with the bearing roller 13 under control and not by jerks, a return cylinder A can be acted upon with a preset damping pressure via a pressure regulation valve H.

If, simultaneously or within a predetermined time interval, apart from the first proximity switch S4 the second proximity switch S4' also responds, a double bearing roller pair is involved. If the proximity switch S4 alone responds, a single bearing roller pair is involved. During the motion process of carriage F, the proximity switch S5 departs a (not shown) switching element so that the 5/2-way valves Y2, Y2' switch. Air pressure is thereby supplied to the lubricating head cylinders E, E', so that the two lubricating heads D, D' are extended out to the lubrication sites, developed for example as lubricating nipples. By pressing the two lubricating heads D, D' onto the particular roller nipple, a piston delivers the lubricant from a prefilled dosing chamber to the particular lubrication site.

When the proximity switch S6 reaches a second (not shown) switching element, the 5/2-way valves Y2, Y2' are again moved into the resting position. If the proximity switch S4 alone switches, only valve Y2 is driven. A reset spring of the lubricating head cylinder E, E' moves the lubricating heads D, D' back into the starting position. A central supply pump then fills the dosing chamber with lubricant for the next delivery stroke.

After the switching of the proximity switch S6, a programmable time starts. After the passage of the programmable time, the 3/2-way valve Y1 again switches into its starting position. The air pressure moves the catch C back into a starting position. With the aid of a fast venting valve, a fast resetting can be accomplished.

When the catch C has reached its starting position, a proximity switch S8 switches valve Y3. In this way, compressed air acts on the double-action return cylinder A and the damping pressure, which was generated in the forward motion of lubricating apparatus 12, is switched off. The lubricating apparatus 12 moves back into its starting position. The return speed can be regulated via a choke valve I.

A position switch (roller-lever switch) S2 has several safety functions. In the event of failure or a sluggish evaluation of the proximity switch S7, the switching element actuates the position switch S2. In this case, all valves are switched to be voltage-free and the lubricating apparatus 2 remains in its end position. In order to avoid damage through automatic return transport, the lubricating apparatus 2 must be manually brought out of the end position. After the malfunction has been resolved, the lubricating apparatus 2 subsequently moves automatically back into the starting position.

According to the invention, the carriage F, which carries the lubricating apparatus 2, is engaged by an acceleration cylinder (boost cylinder) J. The acceleration cylinder is controlled by a valve such that before or simultaneously with the extension of the catch C, a boosting phase of the carriage F, and thus the lubricating apparatus 2, takes place. The sensor control is thus such that the belt 1 at speeds greater than a predetermined maximum speed, for example greater than 0.4 m/sec, meets the catch C within a predetermined boosting path. The carriage F is therein moved with a boosting speed, settable through the one-way restrictor valve, of, for example, 0.4 m/sec in a direction parallel to belt 1. From the outset, the return cylinder A acts with approximately 0.5 bar against the carriage motion, in order to prevent the rebounding of catch C from belt 1. Approximately 10 mm after the end of the boosting path, the proximity switch S6 actuates the lubricating head D, whereby the lubricating process is initiated. Simultaneously, the acceleration cylinder J becomes pressure-free. After the delivery phase of the lubricant to belt 1, the proximity switch S6 allows the lubricating head D to move back. Simultaneously, the prepressure or the contact pressure of 0.5 bar by an additional valve against the carriage motion is discharged. After a short delay time, the catch C also moves back, which in its end position actuates the proximity switch S8 and thus initiates the return of carriage F. During the return of carriage F, the pressure-free acceleration cylinder J is also moved into the end position. With a one-way restrictor valve I on return cylinder A, the return speed can be set.

When carriage F is again in the starting position, sensor S5 is actuated, which reduces the full return pressure of approximately 6 bars by change-over switching via a pressure reducer by an additional valve to the contact pressure of 0.5 bar.Thus, the lubrication device is again in the starting position.

Figure 5:
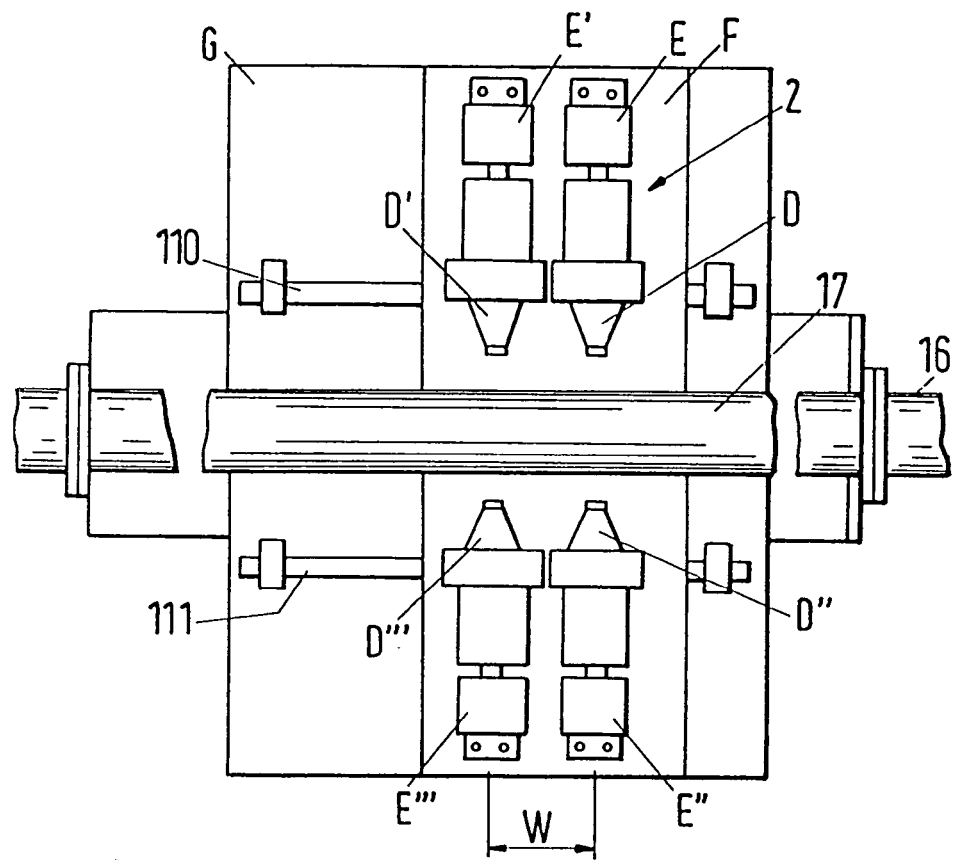
FIG. 5 is a plan view of a lubricating apparatus according to a fourth embodiment of the present invention, including several lubricating heads located in a starting position.
Figure 6:
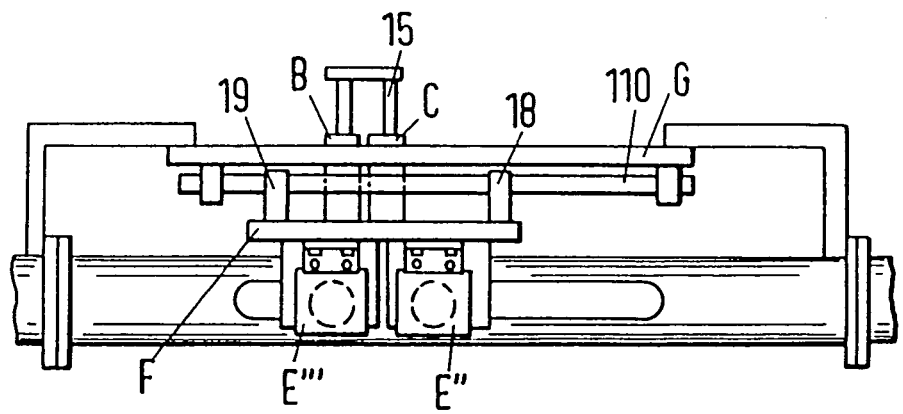
FIG. 6 is a side view of the lubricating apparatus shown in FIG. 5.

FIGS. 5 and 6 show a lubricating device which comprises four lubricating heads D, D'; D", D'", and features similar to those described above are provided with similar reference numbers. The lubricating heads D to D'" are each disposed pairwise opposing one another such that the belt 11 to be lubricated is disposed in each instance between two pairwise lubricating heads D, D" and D', D'" associated with one another to form each pair of bearing rollers. The lubricating heads D to D'" are in a rear end position if the associated cylinders E, E', E", E'" are not acted upon by pressure.

The carriage F equipped with lubricating heads D to D'" is guided via bearings 18, 19 on guide struts 110, 111 parallel to track 17 and linearly parallel to the belt axis. The spacing W of the lubricating heads D, D' or D", D'", respectively, from one another is set for a specific lubricating device and depends on the distance to the lubrication site. Spacing W between two lubricating head pairs D, D"; D', D'" on carriage F is thus adapted in each instance to the spacing Z of two lubrication sites succeeding one another on belt 11. Spacing Z, on the other hand, agrees with spacing X between the two sensors S4, S4'.

Lubricating heads D to D'" are preferably movable pairwise in the direction toward and away from the lubrication sites of the belt it such that the charging forces resulting from the lubrication pressure onto the belt 1 and the lubricating apparatus 2 cancel each other.

Catch C which is accommodated on carriage F with four lubricating heads D to D'", in this case acts perpendicularly from above and its, for example, fork-shaped contour (cf. for example FIGS. 2c and 2d of DE 200 15 780 U) prevents the carriage F from being pushed off when intercepting the roller or chain link bolt 4.

Figure 7:
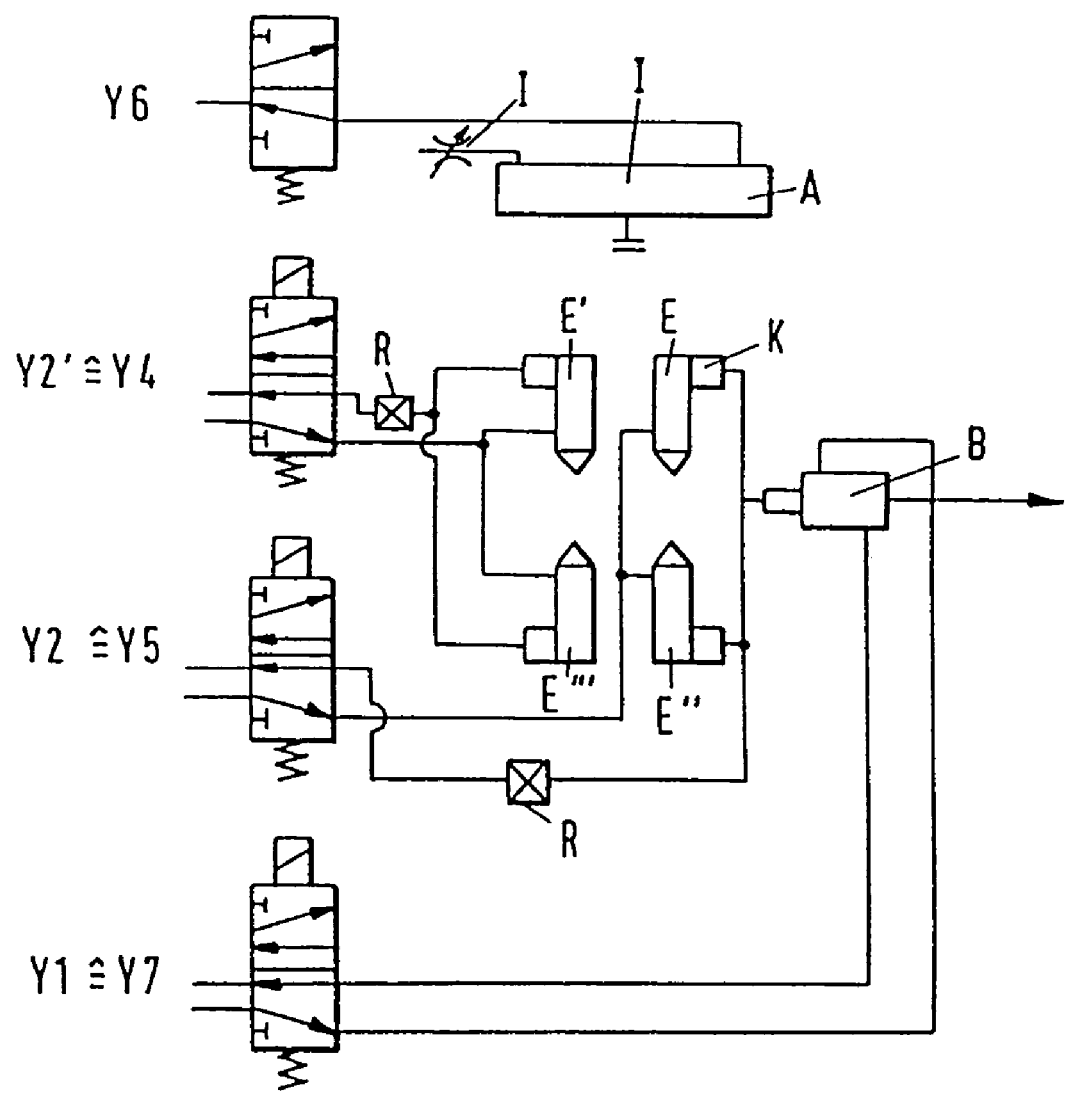
FIG. 7 is a switching plan for the embodiment shown in FIGS. 2 and 3.

A schematic switching plan for driving the lubricating heads D to D''' shown in FIGS. 5 and 6 is depicted in FIG. 7. For the acceleration of carriage F, an acceleration cylinder J (not shown there) is employed, and an electrically actuatable 5/2-way valve (also not shown there) is provided for driving the cylinder J. The four cylinders E to E''' are driven by two 5/2-way valves Y4, Y5. The supply lines and the disposal lines of lubricating heads D, D''; D', D''', each opposing one another in pairs, are pairwise connected to an input or output of the associated 5/2-way valve Y4, Y5 Each cylinder E to E''' is arranged in a pressure/venting line, and one fast venting valve K is associated with each cylinder E to E'''. After the junction of the pairwise associated pressure/venting lines of two opposing lubricating heads D, D''; D', D''' in the pressure/venting line, a pressure regulator R is provided for each line, and the regulator R sets the lubricating head contact pressure. The return cylinder A driven by an electrically actuatable 3/2-way valve Y6 is provided for guiding the carriage F back. The catch cylinder is activated by a further valve Y7.

Figure 8:
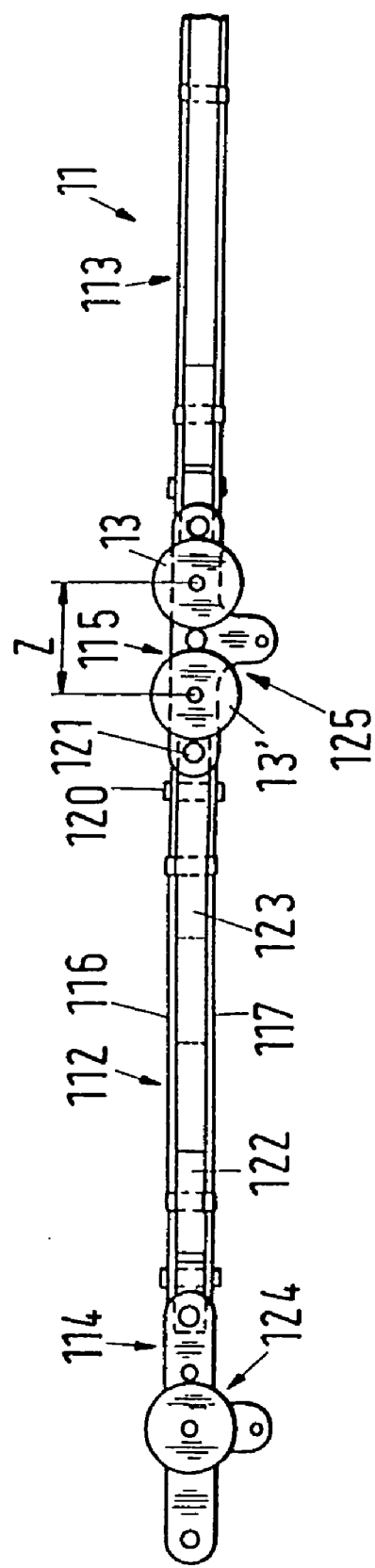
FIG. 8 is a partial side view of a chain belt to be lubricated.
Figure 9:
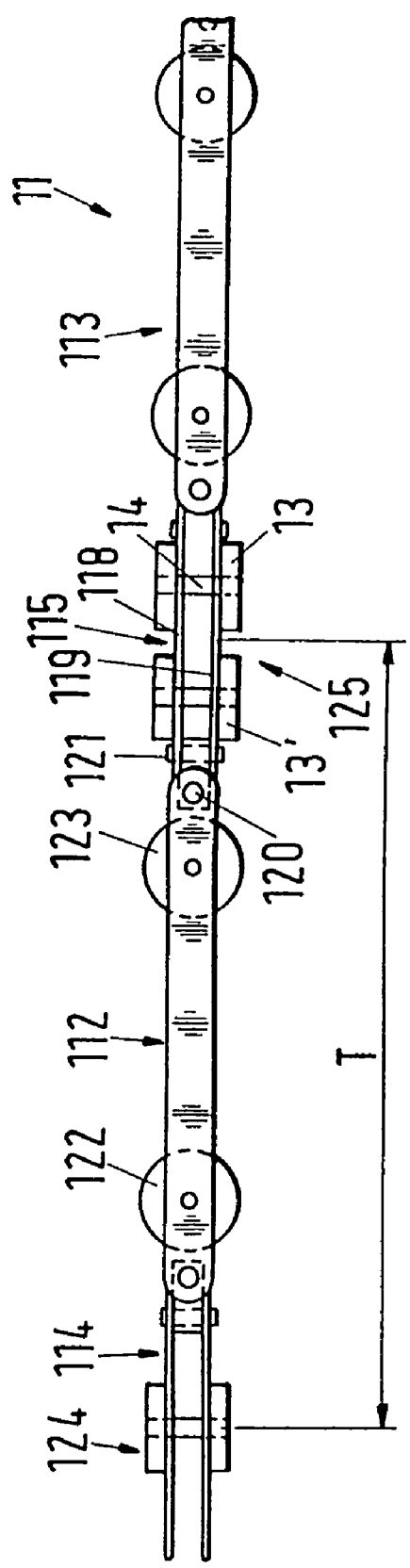
FIG. 9 is a plan view of the chain belt shown in FIG. 5.

FIGS. 8 and 9 show a belt 11 to be lubricated, and the belt is similar to a so-called universal chain or transversely jointed chain. This comprises alternating guide links 112, 113 and bearing or load links 114, 115, which are built in each instance from pairwise identical guide link plates 116, 117 and bearing or load link plates 118, 119. For the articulated connection of the links, clamping sleeves or bolts 120, 121 are provided, and the sleeves 120, 121 are disposed pairwise and offset with respect to one another by 90° on the link ends such that a universal joint function results.

Each guide link 112, 113 comprises individual guidance rollers 122, 123 spaced apart from one another. The bearing or load links 114, 115 are equipped with individual bearing roller pairs 124 or with double bearing roller pairs 125, and each is rotatably supported with roller or chain link bolts 14 on the bearing or load links 114, 115. On the lateral front faces of roller or chain bolts 124 are, for example, lubricating nipples to be lubricated. Individual bearing roller pairs 124 and double bearing roller pairs 125 can each be provided alternatingly as well as at the spacing of a division T.

With the double bearing roller pairs 125, the spacing Z of the roller axes substantially agree with a spacing X of the sensors S4, S4'. The alternating disposition of individual and double bearing roller pairs 124, 125 to be lubricated requires a flexibly adaptable lubrication device.

The control of the lubrication arrangement according to FIGS. 5 to 7 takes place, for example, as follows. Spacing X of sensors S4, S4' is set to spacing Z of the roller axes of a double bearing roller pair 125 such that the detection of an individual or double bearing roller pairs 124, 126 is possible. Simultaneous signals of the two sensors S4, S4' within a predetermined time interval (if the spacings Z and X do not precisely agree) correspond to a double bearing roller pair 125. If the signals of sensors S4, S4'' occur in a greater time interval, an individual bearing roller pair 124 is present. Accordingly, the activation of both lubricating head pairs D, D''; D', D''' or only the activation of one lubricating head pair D, D'' takes place.

The lubrication of the guidance rollers 122, 123 of the universal chain 1 shown in FIGS. 8 and 9 can take place, for example, with a lubrication device according to DE 200 15 780 U with corresponding alignment of the lubricating heads there.

Figure 10:
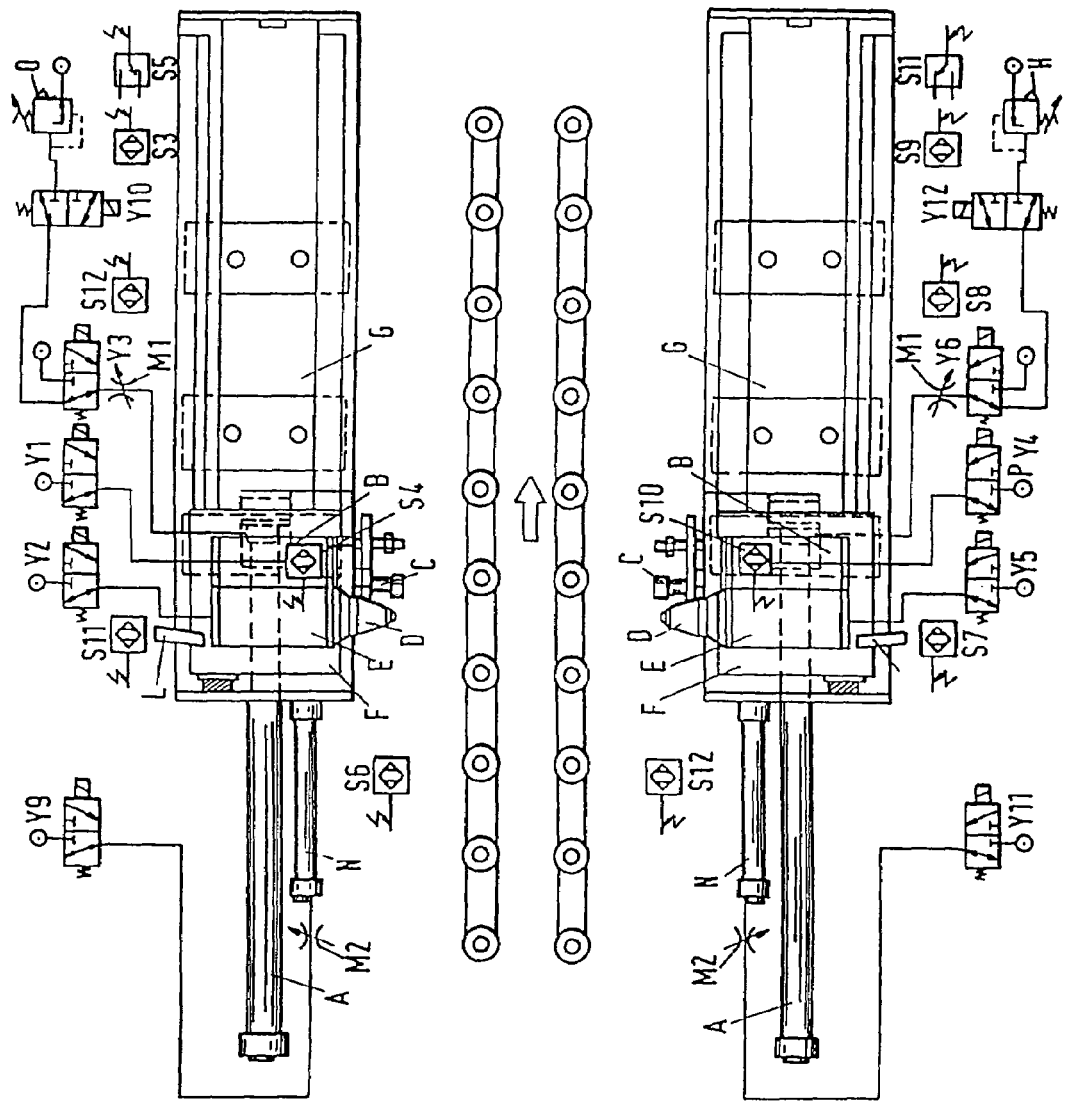
FIG. 10 is a schematic view of a lubrication device of a fifth embodiment in basic position.

The lubrication device depicted in FIG. 10 lubricates traveling lubrication sites on roller and chain belts. To supply the lubrication device with lubricant, central lubrication pumps are provided with pressure limitation valves. In the basic position, the proximity switch S11 is switched. The proximity switch S6 inductively acquires the position of the tread roller and switches the 3/2-way valves Y1 and Y9. The air pressure acts on the catch cylinder B, the catch C extends out; the air pressure acts on the acceleration cylinder N, and the carriage F is moved in the direction of motion of the chain. A boosting of carriage F decreases the force impulse upon the chain roller impacting on the catch C. The sequence of the lubrication processes (for example, every tread roller or, for example, every sixth tread roller) depends on the number of tread rollers and on the speed of the chain or roller belt, or on the roller spacing.

The tread roller to be lubricated intercepts the catch C and moves the lubricating apparatus precisely parallel to the tread roller in order to be able to carry out the lubrication process. The lubricating apparatus is connected with carriage F which is supported so as to be readily movable on frame G. During the motion process, the switching element L intercepts the proximity switch S12 and switches the 3/2-way valve Y2. The air pressure now acts upon the lubricating head cylinder E, and lubricating head D moves toward the lubrication nipple. The proximity switch S12 lies at least 50 mm behind the end position of the boost cylinder piston. This ensures that upon reaching the proximity switch S12, the roller to be lubricated is in contact with catch C. In order for carriage F not to move in a jerking manner, but rather under control along with the tread roller during the lubrication phase, cylinder A is acted upon via a pressure reducer valve O with a damping pressure. The damping pressure is set at the factory to approximately 0.5 bar.

By pressing the lubricating head D onto the roller nipple, a piston delivers the lubricant from a prefilled dosing chamber to the lubrication site.

When the switching element L reaches the proximity switch S3, the damping is terminated. The 3/2-way valve Y10 switches into the resting position. A reset spring of lubricating head cylinder E moves the lubricating head D into its starting position, and during this movement, a central supply pump fills the dosing chamber with lubricant for the next delivery stroke. Simultaneously, a delay time is programmed into the control. After passage of this delay time, valve Y1 switches into the resting position, and a reset spring moves the catch C back.

When the catch C reaches its resting position, it switches the 3/2-way valve Y3 via switch S4. The system air pressure moves the lubricating apparatus with the cylinder A into the base position. The return speed is set with the one-way restrictor valve M1. Simultaneously, valve Y10 switches. This ensures that carriage F is retained by the damping pressure in the base position if the valve Y3 is again switched voltage-free. When carriage F reaches its starting position, switching element L switches the valve Y3 into the resting position via switch S1. The lubricating apparatus is in stand-by condition for the next lubrication pulse.

The position switch S5 has only safety functions during failure or sluggish evalution of proximity switch S3, the switching element L actuates the position switch S5. All valves are switched to be voltage-free. The lubricating apparatus remains standing in the end position. In order to avoid damage through automatic return transport, the lubricating apparatus must be moved manually out of the end position. By resolving the malfunction, the lubricating apparatus subsequently automatically moves back into the base position.

All air connections to the pneumatic cylinders are equipped with fast venting valves in order to ensure a satisfactory operating speed of the lubrication device.

LIST OF REFERENCE SYMBOLS

1 Belt or the like
2 Lubricating apparatus
3 Rollers
4 Swivel axle
5 Catch arm
6 Roller or chain link axle
7 Fork-shaped end
8 Swivel axle
9 Edge
10 Track
11 Belt or the like
12 Lubricating apparatus
13 Bearing rollers
14 Roller or chain link bolt
15 Catch arm
16 Edge
17 Track
18, 19 Bearing
110, 111 Guide struts
112, 113 Guide links
114, 115 Bearing or load links
116, 117 Guide link plates
118, 119 Bearing or load link plates
120, 121 Clamping sleeves, bolts or the like
122, 123 Guidance rollers
124 Individual bearing roller pair
125 Double bearing roller pair
A Return cylinder
B Catch cylinder
C Catch
D Lubricating head
E Lubricating head cylinder
F Carriage
G Frame
H Pressure regulator
I Choke valve
J Acceleration cylinder
K Fast venting valve
L Switching element
M1 One-way restrictor valve
M2 One-way restrictor valve
N Boost cylinder
O Pressure reducer valve
R Pressure regulator
S1 Pressure switch
S2 Roller-lever switch
S3 to S12 Proximity switch
T Division
W Spacing of lubricating heads D, D'
X Spacing of sensors S4, S4'
Y1 to Y12 Valves
Z Spacing of roller axes or lubrication sites

We claim:

1. A lubrication device for lubricating lubrication sites on a belt moving along a lubrication site path of movement, comprising:
a lubricating apparatus operable to move back and forth parallel to the lubrication site path of movement between a starting position and a run path ending position, said lubricating apparatus including:
a catch operable to pivot between a resting position, whereat said catch is not engaged with the belt, and a catch position, whereat said catch engages the belt such that the belt moves said lubricating apparatus parallel to the lubrication site path of movement at a speed of the belt from the starting position to the run path ending position; and
a lubricating head operable to supply lubricant to a lubrication site on the belt while said catch is in the catch position and while said lubrication apparatus is moving parallel to the lubrication site path of movement from the starting position to the run path ending position; and
a track for supporting the belt, wherein at least one of said lubricating apparatus and said track is operable to move transverse to the lubrication site path of movement such that the lubrication site and said lubricating head of said lubrication apparatus approach each other.

2. The lubrication device of claim 1, wherein said lubricating apparatus is further operable to move parallel to the lubrication site path of movement from the starting position to the run path ending position at a boosting speed before or simultaneously as said catch pivots into the catch position so as to engage the belt, said boosting speed being greater than zero and less than the speed of the belt, the boosting speed being no less than 0.4 m/sec less than the speed of the belt.

3. The lubrication device of claim 1, wherein said lubricating apparatus is further operable to move parallel to the lubrication site path of movement from the starting position to the run path ending position at a boosting speed before or simultaneously as said catch pivots into the catch position so as to engage the belt, the boosting speed being no greater than 0.4 m/sec.

4. The lubrication device of claim 3, further comprising an acceleration cylinder for moving said lubricating apparatus at the boosting speed, said acceleration cylinder being shaped and designed to be pressure-free when said lubricating head begins the supply of the lubricant.

5. The lubrication device of claim 4, wherein said acceleration cylinder is operable to move pressure-free into a starting position while said lubricating apparatus moves parallel to the lubrication site path of movement from the run path ending position back to the starting position.

6. The lubrication device of claim 3, further comprising a return cylinder including a one-way restrictor valve for setting a return speed of said lubricating apparatus parallel to the lubrication site path of movement from the run path ending position back to the starting position.

7. The lubrication device of claim 3, further comprising a return cylinder operable to apply a counter-pressure of 0.5 bar to said lubricating apparatus while said lubricating apparatus is moving parallel to the lubrication site path of movement from the starting position toward the run path ending position at the boosting speed, and operable to apply a return pressure of 6.0 bar to said lubricating apparatus while said lubricating apparatus is moving parallel to the lubrication site path of movement from the run path ending position back to the starting position.

8. The lubrication device of claim 1, further comprising an acceleration device for moving said lubricating apparatus parallel to the lubrication site path of movement from the starting position toward the run path ending position at a boosting speed, and a reset device for applying a force against said lubricating apparatus in a direction parallel to the lubrication site path of movement in a direction from the run path ending position toward the starting position.

9. The lubrication device of claim 8, wherein said acceleration device comprises one of an acceleration cylinder and a setting motor, and wherein said reset device comprises a return cylinder.

10. The lubrication device of claim 1, further comprising a one-way restrictor valve for setting a boosting speed of said lubricating apparatus moving parallel to the lubrication site path of movement from the starting position toward the run path ending position.

11. The lubrication device of claim 1, wherein said lubricating apparatus is operable to move in a direction transverse to the lubrication site path of movement such that said lubricating head of said lubrication apparatus approaches the lubrication site.

12. The lubrication device of claim 1, wherein said track is operable to be moved by said catch of said lubricating apparatus in a direction transverse to the lubrication site path of movement such that the lubrication site approaches said lubricating head of said lubrication apparatus.

13. The lubrication device of claim 1, wherein said catch includes a catch arm operable to engage the belt from above or below the belt.

14. The lubrication device of claim 13, wherein said catch arm has a fork-shaped outer end for engaging the belt.

15. The lubrication device of claim 13, wherein said catch arm is operable to pivot outward toward the lubrication site path of movement.

16. The lubrication device of claim 1, further comprising two sensors spaced apart parallel to the lubrication site path of movement of the belt, said two sensors being operable to detect two lubrication sites spaced apart along the longitudinal axis of the belt, wherein said lubricating apparatus includes at least two lubricating heads spaced apart parallel to the lubrication site path of movement of the belt for supplying lubricant to the two lubrication sites.

17. The lubrication device of claim 16, wherein said two sensors are spaced apart a separation distance equal to a separation distance between the two lubrication sites of the belt.

18. The lubrication device of claim 16, wherein said two sensors are adjustably mounted such that a separation distance between said two sensors can be adjusted.

19. The lubrication device of claim 16, wherein said lubricating apparatus includes two pairs of opposing lubricating heads spaced apart parallel to the lubrication site path of movement of the belt for supplying lubricant to the two lubrication sites, each of said pairs of opposing lubricating heads being operable in tandem.

20. The lubrication device of claim 16, wherein said lubricating apparatus further includes a carriage and two pairs of opposing lubricating heads mounted on said carriage so as to be spaced apart parallel to the lubrication site path of movement of the belt for supplying lubricant to the two lubrication sites.

21. The lubrication device of claim 20, wherein said carriage supports said catch.

22. The lubrication device of claim 16, wherein said lubricating apparatus includes two pairs of opposing lubricating heads spaced apart parallel to the lubrication site path of movement of the belt for supplying lubricant to the two lubrication sites, said pairs of opposing lubricating head being arranged mirror-symmetrically with respect to the belt.

23. The lubrication device of claim 1, wherein said lubricating apparatus includes at least two lubricating heads opposing each other on opposite sides of the belt, said lubricating heads being operable to synchronously move in a direction transverse to the lubrication site path of movement such that said lubricating heads approach the lubrication site.

* * * * *